June 7, 1966  G. JAHN  3,254,861
SPINNING REEL IMPROVEMENT
Filed April 4, 1963
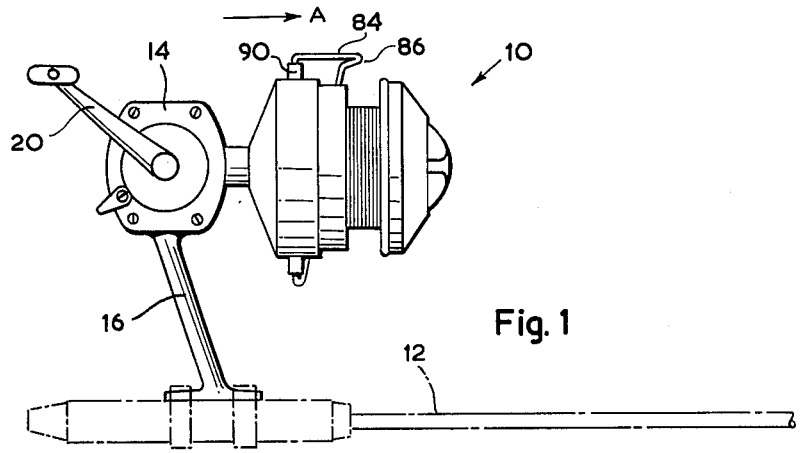
Fig. 1
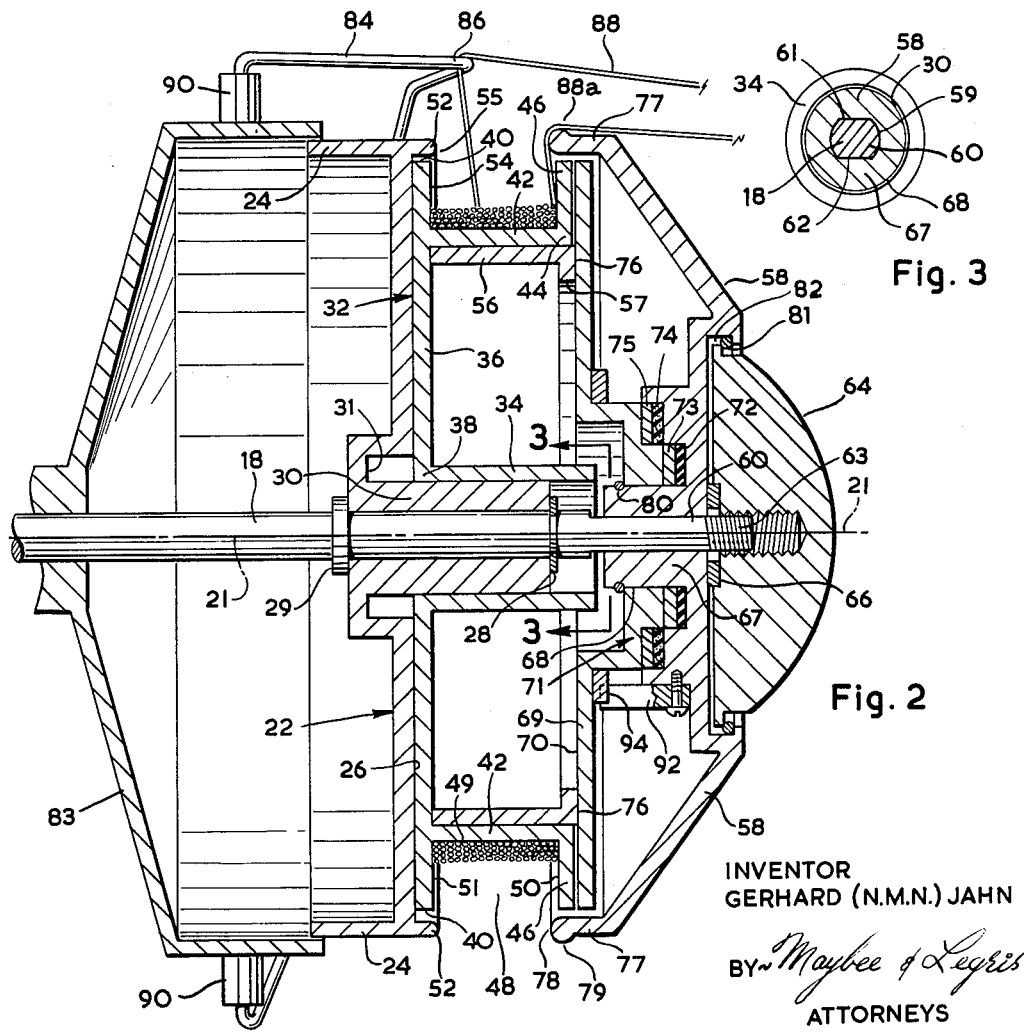
Fig. 2
Fig. 3
INVENTOR
GERHARD (N.M.N.) JAHN
BY Maybee & Legris
ATTORNEYS

United States Patent Office 3,254,861
Patented June 7, 1966

3,254,861
SPINNING REEL IMPROVEMENT
Gerhard Jahn, 2460 Keele St., Apt. 104,
Toronto, Ontario, Canada
Filed Apr. 4, 1963, Ser. No. 270,688
10 Claims. (Cl. 242—84.21)

This invention relates to spinning reels.

One object of this invention is to provide a spinning reel in which the spool on which fishing line is collected is easily detachable from the reel, so that another similar spool carrying a different fishing line, may be quickly inserted in its place.

Another object of this invention is to provide reel structure whereby the fiishing line, when being removed from or wound upon the spool, is prevented from frictional contact with the spool, permitting the use of rough unfinished spool surfaces without danger of fraying or wearing the fishing line.

A further object of this invention is to provide a reel-spool combination in which, during operation, no portion of the spool is in moving or rubbing contact with the elements of the reel that support the spool, permitting the spool to be constructed of material with low abrasion and heat resistance, such as certain thermoplastic resin.

A still further object of this invention is to provide reel construction permitting the use of structurally weak material for the spool.

These and other objects will appear throughout the body of this description. One embodiment of the invention is illustrated in the accompanying drawings, in which:

FIG. 1 is an elevation view of a fishing reel and a portion of a fishing rod to which the reel is attached;

FIG. 2 is an axial sectional view of the forward portion of the fishing reel of FIG. 1; and FIG. 3 is a transverse section taken at 3—3 in FIG. 2.

In FIG. 1 a fishing reel shown generally at 10 is mounted on a fishing rod 12, only part of which is illustrated in the figure. Extending from a gear case 14 is a leg 16 which mounts the reel 10 on the fishing rod 12. The gear case 14 constitutes mounting means for a cylindrical shaft 18 (not shown in FIG. 1, but visible in FIG. 2) which extends forwardly in the direction of arrow A from the mounting means. Rotation of a handle 20, via known motion transmitting gear means (not shown) within the gear case 14, causes the shaft 18 to reciprocate axially while remaining fixed against angular rotation relative to the mounting means.

In the sectional view shown in FIG. 2, all elements not hereinafter described otherwise are assumed to be radially symmetrical about the axis 21 of the shaft 18.

A cylindrical drum 22 having a cylindrical side wall 24 and a planar circular forward surface 26 is fixed axially relative to the shaft 18 between a split-ring retainer 28 and a ring 29 integral with the shaft 18, but is mounted for free rotation about the shaft in a plane normal to the shaft 18. The cylindrical drum 22 has an integral collar 30 which extends forwardly around the shaft 18 from a central recess 31 in the planar circular forward surface 26. Mounted forwardly of the cylindrical drum 22 is a replaceable plastic spool 32 comprising a cylindrical boss 34 fitting snugly about the integral collar 30 of the cylindrical durm 22 and a disc 36 integral with the rearward end 38 of the cylindrical boss 34. The disc 36 supports inwardly from its periphery 40 an integral forwardly projecting hollow cylinder 42 coaxial with the cylindrical boss 34. From the forward edge 44 of the hollow cylinder 42 an annular flange 46 extends radially outwardly. Thus an outwardly opening groove 48 is defined, having a base 49 a forward edge 50 and a rearward edge 51. The planar circular forward surface 26 of the cylindrical drum 22 extends slightly beyond the periphery 40 of the disc 36 of the spool 32, and has a smooth integral forwardly projecting ridge 52 which extends slightly forwardly. of the forward face 54 of the disc 36 as at 55.

A metal cylindrical ring 56, the outside diameter of which is slightly smaller than the inside diameter of the hollow cylinder 42, fits within the hollow cylinder 42. The sum of the axial extents of the metal cylindrical ring 56 and the disc 36 is slightly greater than the axial extent of the spool 36 at the hollow cylinder 42. At the forward edge of the metal cylindrical ring 56 is an annular inwardly extending ridge 57, by which the ring 56 may be gripped to remove it from or insert it into position within the hollow cylinder 42.

A lip-plate 58 is slidably mounted on the shaft 18, and is fixed against angular rotation relative to the shaft by virtue of having an oval bore 59, shown in cross-section in FIG. 3, into which fits the forward end 60 of the shaft 18, also of oval cross-section. The oval shape of the originally cylindrical forward end 60 of the shaft 18 results from the removal of two diametrically opposed cylindrical segments (61 and 62 in FIG. 3).

The foremost section 63 of the forward end 60 of the shaft 18 is externally threaded on its cylindrical faces, and thus may receive an internally threaded thumb-nut 64. The thumb-nut 64 as it is tightened bears rearwardly against a washer 66, which in turn bears rearwardly against the lip-plate 58.

The lip-plate 58 has a hub 67 with a cylindrical outer surface 68. Mounted on the hub 67 for rotation relative to the lip-plate 58 is a radially symmetrical element 69 having a planar annular rearward face 70. Between the element 69 and the lip-plate 58 are arranged two pairs 71 of friction washers: an inner pair comprising a rubber washer 72 fixed to the lip-plate 58 and a metal washer 73 fixed to the element 69, and an outer pair comprising a leather washer 74 fixed to the lip-plate 58 and a metal washer 75 fixed to the element 69.

As the thumb-nut 64 tightens rearwardly against the lip-plate 58, the lip-plate 58 in turn bears against the element 69. The element 69 bears rearwardly against the forward edge 76 of the metal cylindrical ring 56, thereby compressing the ring 56 and the disc 36 of the spool 32 between the element 69 and the cylindrical drum 22. The spool 32 is thus firmly gripped between the element 69 and the cylindrical drum 22 at the thin annular portion of the disc 36 against which the metal cylindrical ring 56 bears. It is to be understood that the disc 36 of the spool 32 need not be a solid, imperforate disc. The disc 36 could consist of inwardly projecting spokes etc.

The lip-plate 58 carries around its periphery a rearwardly extending annular lip 77 having a smooth rearward edge 78 which, when the two pair of friction washers bear against one another, is positioned slightly rearwardly of the forward edge 50 of the groove 48 of the spool 32. At the rearward edge 78 is a smooth, annular outwardly projecting ridge 79.

A split-ring retainer 80 holds the element 69 in position on the hub 67 of the lip-plate 58. Another split-ring retainer 81 holds the thumb-nut 64 within a cavity 82 in the forward face of the lip-plate 58.

A cylindrical spool housing 83 is provided which, by means of well-known motion transmitting means in the gear case, is caused to rotate about the reciprocating shaft 18 while remaining axially stationary. The cylindrical drum 22, mounted on the shaft 18, reciprocates within the spool housing 83. The spool housing 83 carries a semi-circular full bail line pickup 84 having a line guide 86 which orbits the outwardly opening groove 48 of the spool 32 to guide a line 88 into the groove 48 simultaneously with reciprocation of the shaft. The full bail line pick-up 84 may be disengaged from the line 88 for casting by being pivoted about bosses 90.

A ratchet spring 92 is mounted on the lip-plate 58, and a ratchet washer 94 is mounted on the element 69. The ratchet spring 92 and the ratchet washer 94 co-operate, in known fashion, to permit relative rotation between the element 69 and the lip-plate 58 in one direction only. The clicking noise generated by the ratchet spring when the element 69 slips (rotates) with respect to the lip-plate 58 serves to notify the user that such slipping is taking place.

In operation, the line 88 may be cast by first pivoting the line pick-up 84 about the bosses 90 so as to disengage it from the line 88. The line 88 is then free to slither off the spool 32 in the forward direction (as at 88a) without coming into contact with the forward edge 50 of the groove 48, since the line must pass around the rearward edge 78 of the lip 77 of the lip-plate 58. Contact between the line 88 and the lip-plate 58 is kept to a minimum by virtue of the outwardly projecting ridge 79 which suspends the line 88 outwardly of the main portion of the lip 77.

To reel in the line 88 after casting or otherwise letting out line, the line 88 is first engaged by rotating the line pick-up 84 so that the line 88 runs through the line guide 86. Rotation of the handle 20 causes the shaft 18 and thus the spool 32 to reciprocate axially without rotating, and causes the spool housing 83 and thus the line guide 86 to rotate about the shaft without reciprocating, thus laying the line 88 evenly into the outwardly opening groove 48 of the spool 32.

During the reeling operation there will be a certain minimum tension in the line 88, and thus a certain torque on the spool 32. As long as this torque remains minimal, the spool 32 will remain stationary relative to the shaft 18. However, a greatly increased tension in the line 88, and thus an increased torque on the spool 32, may be caused by a snag or a fish. In order to prevent the line 88 from undergoing tensions greater than its design limit, the thumb-nut 64 is adjusted such that slippage will occur between the pairs 71 of friction washers at a line tension below that at which the line 88 will break.

It is clear from elementary friction theory that, given comparable coefficients of friction at the friction washers 71 and at the surfaces by which the spool 32 is gripped (the edges of the metal cylindrical ring 56, the rearward face 70 of the element 69, the surfaces of the disc 36, etc.), slippage due to torque on the spool 32 (produced by line tension) will occur at the friction washers 71 rather than at the metal cylindrical ring 56, since the friction washers 71 are closer to the axis 21 of the shaft 18.

As the tension in the line 88 exceeds that for which the thumb-nut 64 is set, slippage will occur at the washers 71, and the element 69, the spool 32 and the cylindrical drum 22 will rotate together with respect to the lip-plate 58. The spool 32 is thus kept from any moving or rubbing contact with the elements by which it is gripped.

As the orbiting line guide 86, during reeling, lays line 88 into the outwardly opening groove 48, the line is prevented from contacting the forward side edge 50 and the rearward side edge 51 of the groove 48 by, respectively, the lip 77 and the ridge 52.

As well as serving as a member by which the spool 32 is gripped between the element 69 and the cylindrical drum 22, the metal cylindrical ring 56 serves to reinforce the hollow cylinder 42 of the spool 32 against deformation and possible cracking resulting from being wound with the line 88 under considerable tension.

It is not necessary, for the exercise of this invention that the shaft 18 be non-rotating and axially reciprocal, and other mechanisms governing the relative motion of the elements comprising the reel are contemplated within the scope of this invention.

What I claim as my invention is:

1. A spining reel comprising a shaft, mounting means supporting the shaft, the shaft extending forwardly of the mounting means, gripping means comprising a first element fixed axially on the shaft and a second element mounted on the shaft forwardly of the first element, the first and second elements being mounted for rotation relative to the shaft, the first and second elements gripping between them a replaceable spool, the spool having an annular groove defined by a base and a rearward and forward side edge and opening outwardly between the first and second elements, the spool being oriented co-axially with the shaft, means forwardly of the spool supporting a rearwardly extending annular lip in substantially fixed axial relation to the spool, the inside diameter of the annular lip being greater than the outside diameter of the said forward side edge of the annular groove, the annular lip having a smooth rearward edge positioned slightly rearwardly of the forward side edge of the annular groove and forwardly of the rearward side edge of the annular groove, variable friction means operable between the gripping means and the shaft to adjustably resist the rotation of the gripping means and thus the spool relative to the shaft, the spool being capable of receiving in its outwardly opening annular groove windings of a line which, when slithering off said spool in the forward direction, is prevented from contact with said forward side edge by the smooth rearward edge of the annular lip around which smooth rearward edge the line passes.

2. A spinning reel as claimed in claim 1 in which the base of the outwardly opening annular groove is the outer surface of a hollow cylinder constituting part of the spool, disc means constituting part of the spool extending radially inwardly from one end of the hollow cylinder of the spool, the gripping means including cylinder means of which the outside diameter is slightly smaller than the inside diameter of the hollow cylinder of the spool, the cylinder means fitting within and thus reinforcing the hollow cylinder of the spool, the cylinder means and the disc means being compressed together between the first and second elements of the gripping means, the spool being gripped thereby.

3. A spinning reel as claimed in claim 1 in which the shaft is fixed against rotation with respect to the mounting means, said lip supporting means including a lip-plate mounted on the shaft forwardly of said second element of the gripping means, the lip-plate supporting the rearwardly extending annular lip, the lip-plate being fixed against angular displacement relative to the shaft and substantially fixed against axial displacement relative to the shaft, the variable friction means being located between the second element of the gripping means and the lip-plate, the variable friction means thus adjustably resisting through the intermediary of the lip-plate the rotation of the gripping means and thus the spool relative to the shaft.

4. A spinning reel as claimed in claim 3, in which the shaft carries forwardly of the lip-plate threaded means by which the lip-plate may be urged rearwardly towards the second element, the lip-plate having inwardly of the outwardly opening annular groove of the spool a first annular rearwardly facing friction surface, the second element of the gripping means having a second annular forwardly facing friction surface complementary to the first friction surface, the first and second friction surfaces bearing against one another as the lip-plate is urged rearwardly by said threaded means, the torque necessary to overcome the friction between the first and second friction surfaces and thus between the lip-plate and the second element varying with greater or lesser rearward urging of the lip-plate by the threaded means.

5. A spinning reel as claimed in claim 4 in which the threaded means comprises a thumb-nut threaded upon the forward end of the shaft, the thumb-nut bearing rearwardly against the lip-plate.

6. A spinning reel comprising a shaft, mounting means supporting the shaft for axial reciprocation and to restrain angular rotation, the shaft extending forwardly of the mounting means, gripping means comprising a first and a second element mounted on the shaft, the first element having a planar circular forward surface fixed axially relative to the shaft and mounted for free rotation in a plane normal to the shaft, a spool comprising a disc co-axial with the shaft, the disc supporting inwardly from its periphery a co-axial hollow cylinder, an annular flange extending radially outwardly from the edge of the hollow cylinder remote from the disc, thus defining an outwardly opening groove having a base and a rearward and forward side edge, cylinder means of which the outside diameter is slightly smaller than the inside diameter of the co-axial hollow cylinder of the spool, the cylinder means fitting within and thus reinforcing the co-axial hollow cylinder of the spool, the sum of the axial extents of the cylinder means and the disc being slightly greater than the axial extent of the spool at its co-axial hollow cylinder, the second element of the gripping means mounted forwardly of the spool for rotation relative to the shaft, the cylinder means and the disc being compressed together between the first and second elements of the gripping means, the spool being gripped thereby, means forwardly of the spool supporting a rearwardly extending annular lip in substantially fixed axial relation to the shaft and thus the spool, the inside diameter of the annular lip being greater than the outside diameter of the annular flange of the spool, the annular lip having a smooth rearward edge positioned slightly rearwardly of the rearward face of said annular flange and forwardly of said disc, variable friction means operable between the gripping means and the shaft to adjustably resist the rotation of the gripping means and thus the spool relative to the shaft.

7. A spinning reel as claimed in claim 6 in which the gripping means includes a collar extending around the shaft between the first and second elements, the disc of the spool abutting against the collar.

8. A spinning reel as claimed in claim 6 in which said lip supporting means includes a lip-plate mounted on the shaft forwardly of said second element of the gripping means, the lip-plate supporting the rearwardly extending annular lip, the lip-plate being fixed against angular displacement and substantially fixed against axial displacement relative to the shaft, the variable friction means being located between the second element of the gripping means and the lip-plate, the variable friction means thus adjustably resisting through the intermediary of the lip-plate the rotation of the gripping means and thus the spool relative to the shaft.

9. A spinning reel as claimed in claim 6 in which the planar circular forward surface of the first element extends slightly beyond the periphery of the spool adjacent the first element, the circular surface having a smooth integral forwardly projecting ridge of which the inside diameter is greater than the outside diameter of the spool adjacent the first element, the ridge extending slightly forwardly of the rearward side edge of the groove of the spool.

10. A spinning reel comprising a shaft, mounting means supporting the shaft for axial reciprocation and to restrain angular rotation, the shaft extending forwardly of the mounting means, gripping means comprising a first and a second element mounted on the shaft, the first element having a planar circular forward surface fixed axially relative to the shaft and mounted for free rotation in a plane normal to the shaft, a collar integral with the first element extending forwardly around the shaft, a spool comprising a cylindrical boss fitting snugly about the said integral collar, a disc co-axial and integral with the rearward end of said cylindrical boss, the disc supporting inwardly from its periphery a co-axial forwardly projecting hollow cylinder from the forward edge of which an annular flange extends radially outwardly, thus defining an outwardly opening groove, the planar circular forward surface of the first element of the gripping means extending slightly beyond the periphery of the disc of the spool, the planar circular forward surface having a smooth integral forwardly projecting ridge of which the inside diameter is greater than the outside diameter of the disc, the ridge extending slightly forwardly of the forward face of the disc, cylinder means consisting of a metal cylindrical ring of which the outside diameter is slightly smaller than the inside diameter of the forwardly projecting hollow cylinder of the spool, the metal cylindrical ring fitting within and thus reinforcing the forwardly projecting hollow cylinder of the spool, the sum of the axial extents of the metal cylindrical ring and the disc of the spool being slightly greater than the axial extent of the spool at its forwardly projecting hollow cylinder, the second element of the gripping means mounted forwardly of the spool for rotation relative to the shaft, the metal cylindrical ring and the disc being compressed together between the first and second elements of the gripping means, the spool being gripped thereby, a lip-plate mounted on the shaft forwardly of the second element of the gripping means, the lip-plate being fixed against angular rotation relative to the shaft, the lip-plate having inwardly of the outwardly opening annular groove of the spool a first annular rearwardly facing friction surface, the second element of the gripping means having a second annular forwardly facing friction surface complementary to the first friction surface, a thumb-nut threaded upon the forward end of the shaft, the thumb-nut when tightened bearing rearwardly against the lip-plate, the lip plate being thus rearwardly urged by the thumb-nut to cause the first and second friction surfaces to bear against one another, the second element of the gripping means being thus rearwardly urged to compress between the first and second elements of the gripping means the said metal cylindrical ring and the disc of the spool, the torque necessary to overcome the friction between the first and second friction surfaces, thus between the lip-plate and the second element, thus between the shaft and the spool, varying with greater or lesser tightening of the thumb-nut, the lip-plate being thus substantially axially fixed relative to the shaft for any given adjustment of the thumb-nut, the lip-plate having at its periphery a rearwardly extending annular lip the inside diameter of which is greater than the outside diameter of the outwardly extending annular flange of the spool, the annular lip having a smooth rearward edge which, when the first and second friction surfaces bear against one another, is positioned slightly rearwardly of the rearward surface of the outwardly extending annular flange of the spool, the metal cylindrical ring having at its forward edge an inwardly projecting annular ridge, by which the metal cylindrical ring may be gripped for positioning and removal.

References Cited by the Examiner

UNITED STATES PATENTS

| | | | |
|---|---|---|---|
| 2,344,209 | 3/1944 | Lowe | 242—84.21 X |
| 2,558,896 | 7/1951 | Young et al. | 242—84.21 |
| 2,745,607 | 5/1956 | Taggart et al. | 242—84.21 |
| 3,061,231 | 10/1962 | Gayle | 242—84.2 |

FOREIGN PATENTS 760,981   11/1956   Great Britain.

MERVIN STEIN, *Primary Examiner.*

B. S. TAYLOR, *Assistant Examiner.*